United States Patent [19]

Kuljian

[11] 3,744,030

[45] July 3, 1973

[54] INTRINSIC CONTROLS FOR INFORMATION RETRIEVAL SYSTEMS EMPLOYING DIGITAL CODES INTEGRAL WITH AUDIO INFORMATION

[75] Inventor: Maynard J. Kuljian, Palo Alto, Calif.

[73] Assignee: Ampex Corporation, Redwood City, Calif.

[22] Filed: Apr. 28, 1971

[21] Appl. No.: 138,173

[52] U.S. Cl. .............................................. 340/172.5
[51] Int. Cl. .......................... G05b 19/16, G06f 9/00
[58] Field of Search .................. 340/172.5; 235/157; 35/9

[56] References Cited

UNITED STATES PATENTS

| | | | |
|---|---|---|---|
| 3,537,190 | 11/1970 | Serrell et al. | 35/9 A |
| 3,484,950 | 12/1969 | Serrell et al. | 35/9 A |
| 3,360,873 | 1/1968 | Tillotson et al. | 35/9 A |
| 3,141,243 | 7/1964 | Chapman et al. | 35/9 |
| 3,573,744 | 4/1971 | Rigazio | 340/172.5 |

*Primary Examiner*—Paul J. Henon
*Assistant Examiner*—Mark Edward Nusbaum
*Attorney*—Robert G. Clay

[57] ABSTRACT

Intrinsic controls are provided for certain automatic functions in an information retrieval system, employing a digital code formed of a series of selected numbers of cycles, e.g., "tone bursts" of a low frequency within the low end of the audio frequency range. The code format includes a plurality of bits which form a word, wherein the first bit identifies the beginning of the word, the next two bits identify the class of data, and the last of the plurality of bits represents the control data. The code is entered by the programmer along with the information, via a system controller (e.g., computer) and a program encoding system which generates the code in the form of low frequency tone bursts and mixes same with the information.

During retrieval reproduction of the information the low frequency tone bursts representing the code are separated and detected to provide the desired controls for the certain automatic functions of the information retrieval system.

5 Claims, 8 Drawing Figures

INVENTOR.
MAYNARD J. KULJIAN
BY Robert H. Clay
ATTORNEY

INVENTOR
MAYNARD J. KULJIAN
BY Robert H. Clay
ATTORNEY

INTRINSIC CONTROLS FOR INFORMATION RETRIEVAL SYSTEMS EMPLOYING DIGITAL CODES INTEGRAL WITH AUDIO INFORMATION

BACKGROUND OF THE INVENTION

1. Field

The present invention relates to controls for information retrieval systems, and more particularly to an intrinsic control apparatus and process for controlling various associated functions of the retrieval system.

2. Prior Art

Various types of control systems are provided in educational and/or entertainment type of audio/video information retrieval systems to provide automatic control of various functions thereof, such as, calling for pictures, branching instructions, alphanumeric information, special functions, etc. Typical of such control systems are those employing one or more tones to provide some form of system control, which tones are generally recorded on a track separate from that containing the (audio/video) information. Most of these prior systems employ, for example, two control signals of different frequencies, which are generally located in the mid-audible frequency spectrum. Such control signals are not readily filtered out from the audio/video information. Other prior art control systems employ a single tone in combination with the audio/video information; i.e., the single tone is superimposed with the audio/video information in the same track to perform a single function.

The prior art systems mentioned briefly above, have the distinct disadvantages of not providing versatile control for a number of functions, as when utilizing the single tone within the audio track, or require the addition of extra tracks and associated heads, electronics, etc., for storing and extracting the control information.

SUMMARY OF THE INVENTION

The present invention provides a coding system and apparatus therefor, for recording a digital code in the same track as the (audio/video) information is stored. The control code is extracted along with the information via the same channel of electronics, whereupon it is readily separated and diverted to various circuits for controlling various system functions.

The control code is formed of width modulated, low frequency tone bursts. The code format includes a plurality of serial bits which define a word. The first bit identifies the word, the next two data bits identify the class of data, and a selected plurality of subsequent data bits carries the control data. The low frequency signal or tone used to form the code is at the lower end of the audible range (for example, 55 Hertz) which is readily filtered out from the (audio/video) information via simple low frequency filter means. The binary bits which define the data bits, are each formed of a selected number of cycles at the selected low frequency, whereby a "1" or a "0" bit may be determined. The word is sensed employing pulse width demodulation to determine the number of cycles of the single frequency, and thus the existence of a "1" or "0" bit.

Thus the invention system provides a control code which may be readily modified to allow simple expansion for future needs, wherein the code is recorded on the same track as the audio information. Use of the low frequency signal permits mixing the control code with the audio information without placing any constraints on the information programming, while allowing simple extraction of the control code via filter means. Further, use of the low frequency signals on tape is more reliable than the use of high frequencies above the audio audible range, where tape dropouts, head cleanliness, etc., can be problems.

DESCRIPTION OF THE PREFERRED EMBODIMENTS

Figures 1A, 1B, 1C, 1D:
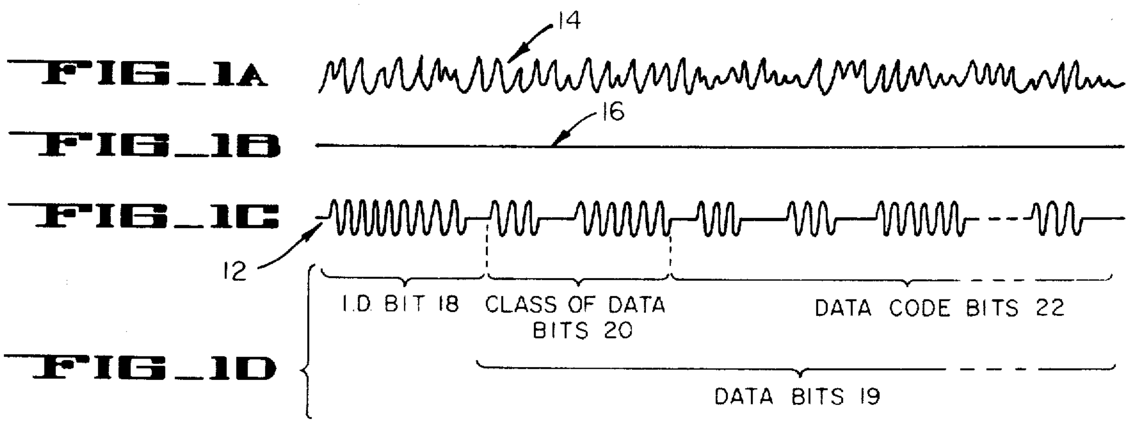
FIG. 1 A–D is a graph showing waveforms depicting the relationship between the audio information and the invention intrinsic control code in terms of frequency versus time.

Referring to FIG. 1 the abcissa of the graph may be considered in terms of increase in frequency towards the top of the page, whereby is depicted the frequency relationship between a format employed by the invention intrinsic control code (FIG. 1C) and the (audio) information waveform (FIG. 1A). The information waveform of FIG. 1A, comprises audio frequency information which represents, in this example, an educational program of an educational program retrieval system. FIG. 1B represents the frequency of filter means, further described below, which separates the low frequency code from the higher frequency audio information, whereby a user may listen to the audio information without interference from the intrinsic control code.

Referring more particularly to FIGS. 1C and 1D there is shown, by way of example only, a waveform 12 illustrating one possible combination of word bits which define the intrinsic control code of the invention. In this exemplary configuration, a series of 10 bits are used to form the word representing the code, wherein the bits are formed of low frequency (55 Hertz) carrier or tone bursts which are width-modulated. A first bit 18 constitutes the "beginning-of-word" (identification) bit and is formed of nine cycles of the 55 Hertz tone. The succeeding nine serial bits comprise data bits 19, wherein a logic "1" is formed for example of six cycles of the 55 Hertz tone, and a logic "0" is formed of three cycles. The first two bits after the identification bit 18 represent "class-of-data" bits 20, and the succeeding seven data bits comprise data code bits 22, which define the specific intrinsic control signals in accordance with the invention.

In operation, the beginning-of-word or identification bit 18 recognized by the reproduce appartus (further described below in FIGS. 3, 5) before the computer will accept the additional information contained in the code word. Also a total of 10 bits must be received by the reproduce apparatus before the word is recognized as valid.

By way of illustration, the two bits comprising the class-of-data bits 20, serve to separate the uses of the subsequent seven data code bits 22 into four broad categories; obviously, other categories are possible.

| CLASS | DATA |
|---|---|
| 00 | Picture Code |
| 01 | Video Message Code |
| 10 | Function Code |
| 11 | Special Code |

By way of example only, the picture code listed above includes a total of seven bits (or $2^7 = 128$ maximum numbers) which can be utilized to represent the first class-of- data, viz., picture addresses. This data when merged with the starting address (specified as the program catalog number and stored in the computer memory), becomes the absolute address located on the list.

Next, the video message code includes a total of seven bits (or $2^7 = 128$ maximum numbers) and is specified in this example for commonly used video messages.

The function code includes a total of seven bits reserved in this example for operational control functions (primarily the automatic stop, but capable of additional operations). These bits also provide answer codes which may be required for automatic testing and scoring, and also action codes for branched and reinforced instruction.

The special code use provides up to 128 special functions. For example, the information programs of the overall system may be preceded by one of these codes to identify the catalog number of the program. Further, the special code permits the arbitrary lengthening of the overall code of FIG. 1C for uses where very large numbers are involved. For example, the intrinsic control code for catalog numbers may be configured with 31 bits if it is desirable to handle data such as Library of Congress numbers having seven decimal digits. Thus it may be seen that the particular 10 bit code 12 exemplified herein may be readily expanded or otherwise modified as required by the particular application.

Figure 2:
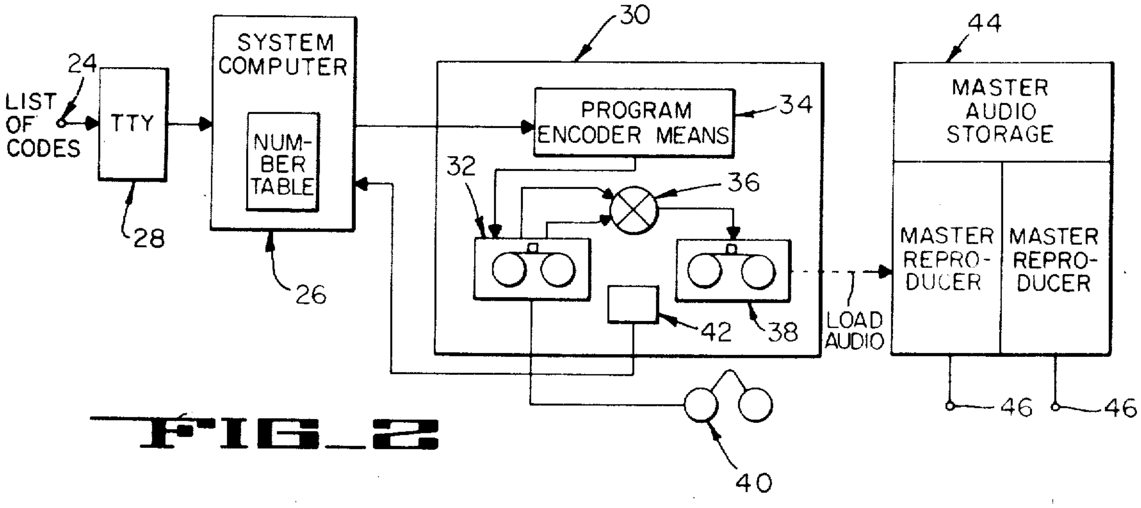
FIG. 2 is a block diagram of the apparatus for encoding and recording the intrinsic control codes of the invention on the same track as the audio information.

Referring now to FIG. 2, there is shown an apparatus for generating and recording the intrinsic control codes in accordance with the invention, which apparatus includes various conventional and/or associated apparatus such as employed in an information storage and retrieval system. A list of codes is composed by a materials developer or a programmer, which list is then used in the programming apparatus of FIG. 2. For example, the list of codes may comprise picture addresses, control functions, and pre-programmed data, which is entered as at numeral 24 to a system computer 26 via a teletype console 28. The system computer 26 is coupled to an audio programming console 30, which is employed by the programmer to mix the intrinsic control codes from the system computer 26 with the program information, e.g., the audio information shown for example in FIG. 1A. The teletype console 28 is a conventional Model, ASR-33 manufactured by Teletype Corporation, see "Technical Manual, 33 Teletypewriter Sets," Bulletin 310B, Volumes 1-3, Feb. 1971 and the system computer 26 is a conventional NOVA general purpose digital computer fabricated by Data General Corporation of Palo Alto, Calif., and described in their operation and maintenance manual "How to Use the NOVA," copyright, 1970.

The console 30 accordingly includes a program recorder 32 such as an Ampex Corporation model 601, see "Ampex Model 601 Operations and Maintenance Manual," Oct. 1958. which is coupled to the output of a program encoder means 34. The latter is coupled to the computer 26. The program recorder provides a pair of outputs which are combined via a summing network 36. The output from the network 36 is introduced for storage on a multiple track tape of a code/program recorder 38, such as an Ampex Corporation Model AG-440, see "AG-440 and AG-445 Recorder and Reproducer Operation and Maintenance Manual," July 1968,. The programmer is supplied with a pair of earphones 40 whereby he may monitor the program stored in one track on the tape of the program recorder 32. At such time as a control code is desired, e.g., when it is desirable to call for a picture, the programmer activates code enable switch means 42 which directs the system computer 26 to introduce the desired code to the program encoder means 34. The code is delivered to and thus recorded on, a separate track paralleling the track in which the program information is stored. Thus corrections may readily be made to the codes at this time. The program and the codes are then introduced from the program recorder 32 via the pair of outputs to the summing network 36, are combined, and introduced to a single, common track of the multiple track tape of the code/program recorder 38 for permanent storage. The program information and superimposed codes are then available on the recorded multiple track tape, which may be manually loaded into a master information storage system 44 of an educational apparatus (indicated by the dashed line) for subsequent use. The master information storage system 44 may constitute a master storage means for storing and handling audio programs, such as commonly employed in educational devices of the type described for example in copending application Ser. No. 758,559, to M. Kuljian, filed Sept. 9, 1968, and issued Sept. 21, 1971 as U.S. Pat. No. 3,609,227, and assigned to the same assignee as this application. An output terminal 46 provides means for extracting the combined (program) information and control code from the master information storage system 44, as further described below.

Figure 3:
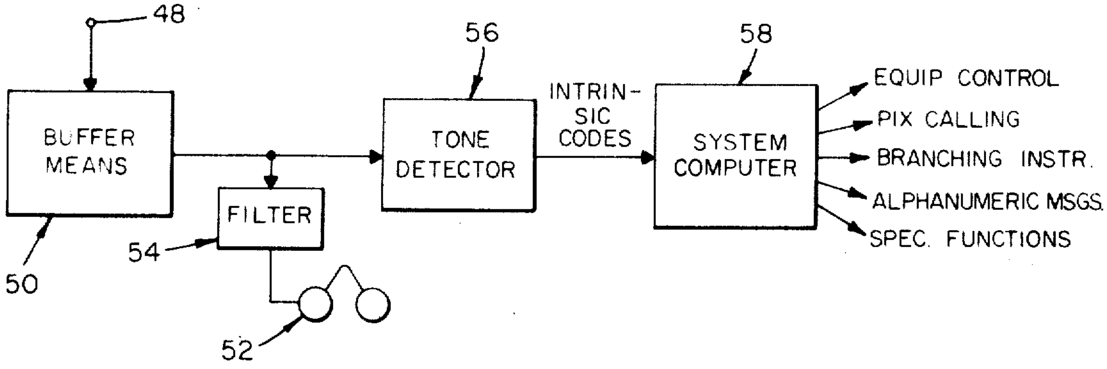
FIG. 3 is a block diagram of the reproduce apparatus employed in utilizing the intrinsic control of the invention.

Referring to FIG. 3, there is shown the reproduce apparatus for utilizing the intrinsic control code of the invention. An input terminal 48 is provided to a student or user buffer system 50, as for example from the master information storage system 44 of FIG. 2. The buffer system 50 is similar to the student buffer of U.S. Pat. No. 3,609,227 and provides means for retrieving the audio information, e.g., an educational program, from a master storage system such as system 44, in the manner conventional to educational devices of the type described in the above-mentioned patent.

The program portion of the information received by the student buffer system 50, is available to the user via a set of headphones 52 and filter means 54. The filtered audio information is delivered to the headphones 52, while the unfiltered audio information is delivered to a tone detector 56. Thus the audio information delivered to the headphones 52 is that shown as waveform 14 in FIG. 1A, whereas the signal delivered to the tone detector 56 comprises the combination of waveforms 12, 14 of FIGS. 1C and 1A respectively.

The tone detector 56 provides circuits for detecting and demodulating the 55 Hertz tone bursts representing the 10 bits of FIG. 1C, and may be any of conventionally known and available tone detecting circuits. The detected intrinsic control codes are then fed to a system computer 58, which in a conventional educational device such as described in the above mentioned patent application, may be the same computer as computer 26 of FIG. 2. As previously described, the intrinsic control codes of the invention delivered by the system computer 58 are available for controlling system functions via output terminals indicated herein by numeral 60.

The components of the blocks in FIGS. 2, 3 herein numbered 32 through 58 are generally conventional in design and readily apparent to one skilled in the art. However, by way of example only, the various apparatus numbered 32 through 58 are described in detail in "Random Access Information Retrieval System, Operation and Maintenance Manual," Oak Park and River Forest High School, Volumes 1–8, published by Ampex Corporation, February, 1971.

Figure 4:
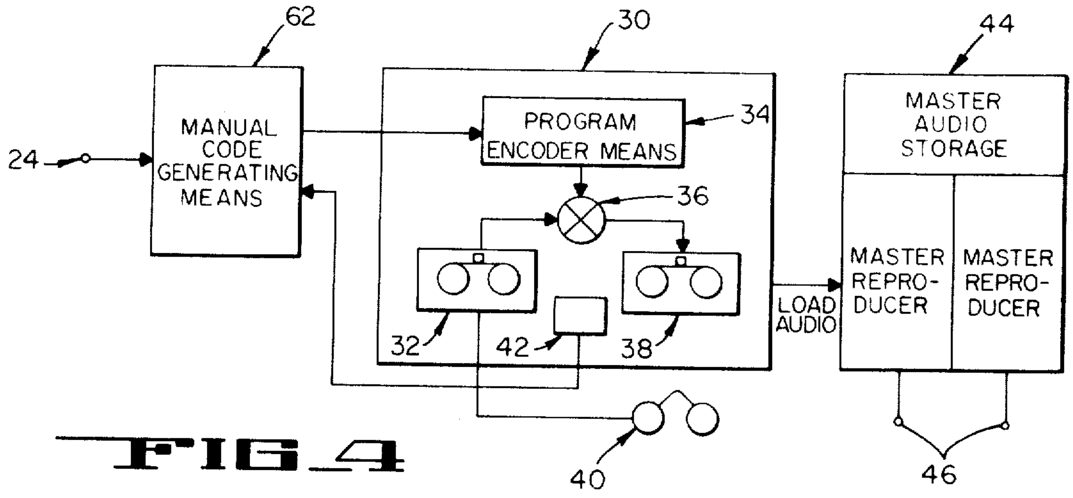
FIGS. 4 and 5 are alternative embodiments of the apparatus for encoding and decoding the intrinsic control code of the invention.

Referring now to FIG. 4 there is shown an alternative, less sophisticated, embodiment of the encoder of the invention, wherein like components are similarly numbered and the system computer 26 and teletype console 28 are replaced by a manually operable code generator 62. The latter generator may comprise, for example, a plurality of selector switches operable by the programmer to provide the desired code to the program encoder means 34; thus the generator 62 may be a Model 200 data generator fabricated by Data Pulse Corporation, Inglewood, Calif., see "instruction Manual Model 200 Word Generator," May 1966.

In addition, FIG. 4 shows an alternative scheme for handling the codes and program information before and after their superposition. To this end, the output from the program encoder means 34 is introduced to the summing network 36, along with the program information stored on a tape of the program recorder 32. The output from the network 36 is introduced for temporary storage to the code/program recorder 38. The programmer thus monitors the program stored in the program recorder 32. At such time as a control code is desired, he activates the code enable switch means 42, which directs the code generating means 62 to introduce the desired code to the program encoder means 34. The code is thus recorded on the code/program recorder 38 along with the program information. The program information is unloaded from the code/program recorder 38 along with the intrinsic control codes, and the superimposed material is introduced to the master information storage system 44 for permanent storage, whereby it is available for subsequent use as described supra in FIGS. 2 and 3.

Figure 5:
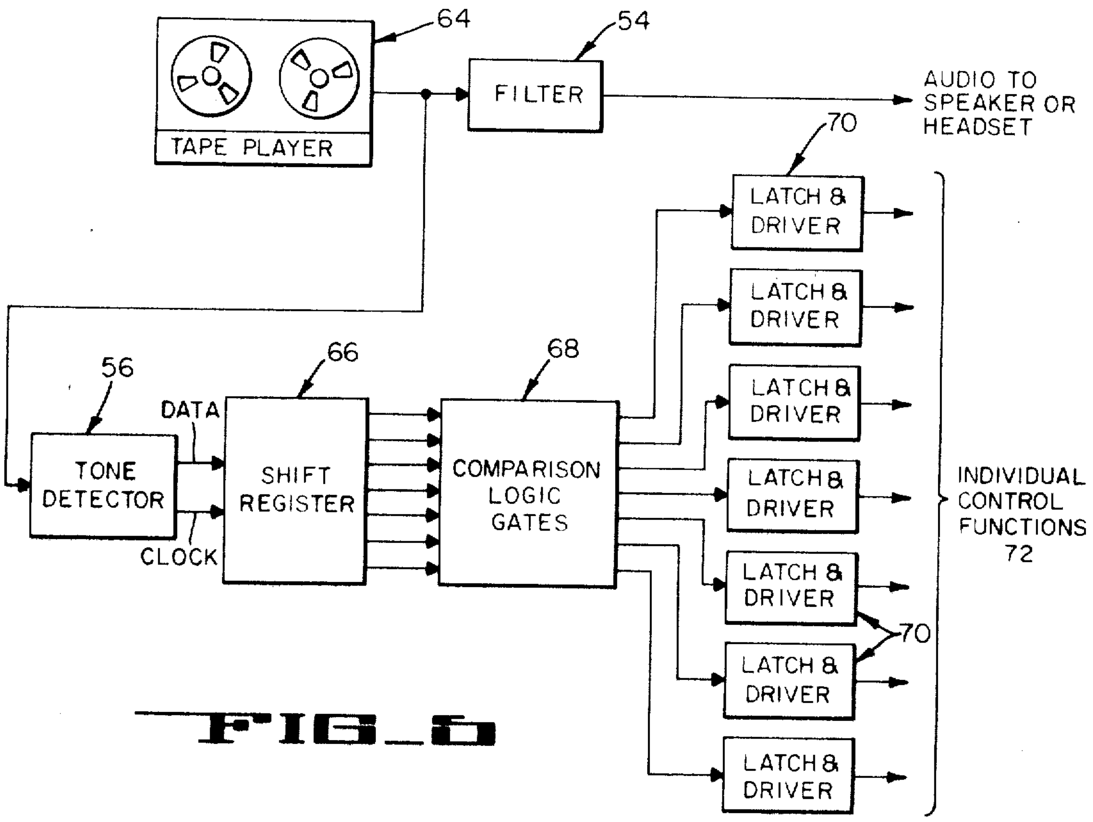

Referring to FIG. 5, an alternative, less sophisticated, embodiment of the decoder of the invention is shown, wherein components similar to those of FIG. 3 are similarly numbered. Accordingly, a tape player 64, such as a conventional tape recorder/player, is adapted to receive a prerecorded tape containing the program information and superimposed codes, such as prepared via the encoder apparatus of FIG. 4. Thus the player 64, in essence, replaces the buffer means 48 of the decoder of FIG. 3 which in turn is similar to the recorders 32, 38 of FIGS. 2, 4. The combined program and codes are introduced via the filter means 54 to the headset, speakers, etc., wherein the low frequency codes are filtered from the program audio so as not to interfere with the oral presentation of the latter. The codes are detected by the tone detector 56, which introduces data and clock signals to a shift register 66. The latter circuit is generally conventional in design and may comprise a serially coupled plurality of registers such as Model UL–9923, see "1970 Fairchild Semi-conductor Integrated Circuit Data Catalogue," copyright 1969, manufactured by Fairchild Corporation which in turn, delivers gating signals to comparison logic gates means 68. The latter circuit is a series of conventional logic gates, which are selectively energized to decode the binary codes into the desired intrinsic control codes, which in turn provide outputs to selected latch and driver circuits 70 as determined by the data bits extracted from the intrinsic control code previously superimposed on the program information. Each of the latch and driver circuits 70 provides means such as a latching relay and an amplifying stage, which holds and amplifies the signal output from the logic gates means 68, and which introduces the signal output to respective utilization apparatus, such as those of FIG. 3, as indicated at numeral 72.

It may be seen, that the decoder apparatus of FIG. 5 is, in essence, a "hard-wired" embodiment of the computer-controlled decoder of FIG. 3, wherein the shift register 66, comparison logic gates means 68 and the latch and driver circuits 70 replace the system computer 58.

I claim:

1. A method for providing intrinsic controls for selected automatic functions in an information retrieval system, the system including a system controller, master information storage means and buffer means, which means are responsive to the system controller to transfer information from the master information storage means to the buffer means, comprising the steps of;

encoding a digital word of selected pluralities of bits to represent the desired control, the bits being defined by a selected modulation of a low frequency carrier signal located below the low end of the usable audio frequency range;

recording the encoded digital word and the information on a single track of the master information storage means;

transferring the combined information and digital word from the master information storage means to the buffer means in response to the system controller;

filtering the low frequency digital word from the information; and detecting the plurality of bits by selected demodulation of the low frequency signal to provide the intrinsic controls.

2. The method of claim 1 wherein the step of encoding further includes the steps of;

modulating the low frequency carrier signal to generate a selected number of cycles of the low frequency below the usable audio frequency range to identify the presence of the digital word;

modulating the low frequency carrier signal to generate different numbers of cycles of the same low frequency to define "1" and "0" data bits respectively, wherein the combined identifying bit and successive data bits form the digital word; and combining the generated identifying bit and successive data bits with the information for subsequent recording on the single track of the master information storage means.

3. The method of claim 2 wherein the step of combining further includes the steps of;

monitoring the information;

temporarily storing the generated identifying bit and successive data bits forming the digital word; and combining the digital word and information for subsequent recording on the single track of the master information storage means.

4. The method of claim 2 wherein the step of combining further includes the steps of;

introducing the information to a summing circuit;

simultaneously introducing the generated identifying bit and successive data bits to the summing circuit at selected times along the information; and combining the bits and the information for subsequent recording on the single track of the master information storage means.

5. The method of claim 2 wherein the step of detecting the plurality of bits further includes the steps of;

sensing the identifying bit to determine the existence of a digital word;

detecting the "1" and "0" data bits to determine the class of data and the data representing the respective intrinsic control; and introducing the detected data bits representing the intrinsic control to the system controller to generate the intrinsic control in accordance with the data bits.

* * * * *